March 24, 1925.
G. E. CLEWETT
1,530,757
DISPENSER FOR MALTED MILK AND OTHER POWDERED SUBSTANCES
Filed Jan. 22, 1920
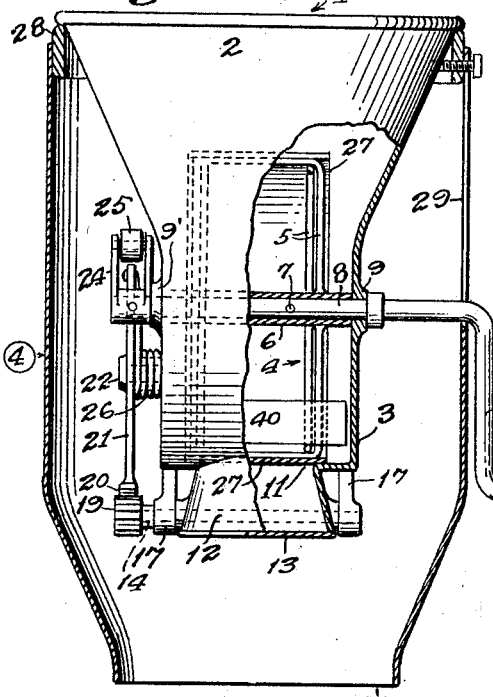
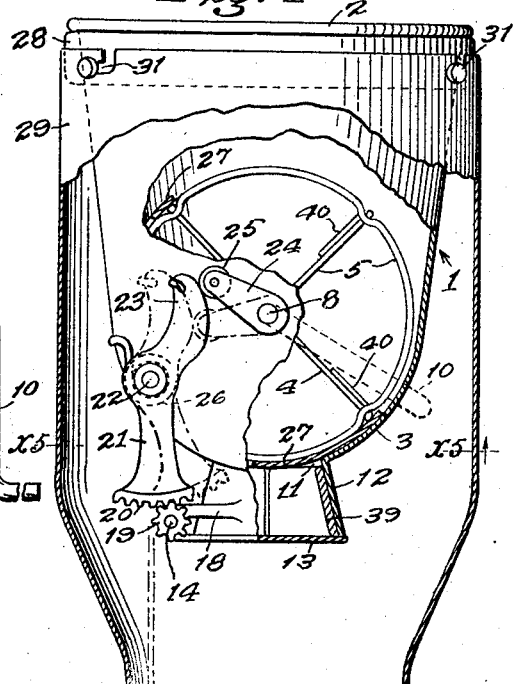
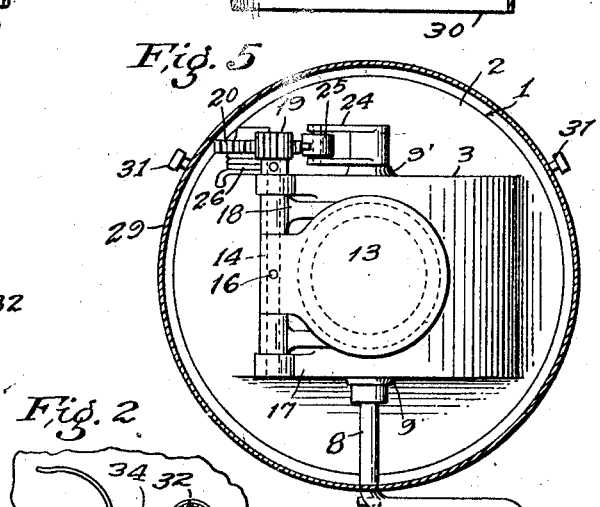
Inventor
George E. Clewett
by James R. Townsend
his atty.
Witness
C. C. Holly.

Patented Mar. 24, 1925.

1,530,757

UNITED STATES PATENT OFFICE.

GEORGE E. CLEWETT, OF LOS ANGELES, CALIFORNIA, ASSIGNOR TO MARIE E. CLEWETT, OF LOS ANGELES, CALIFORNIA.

DISPENSER FOR MALTED MILK AND OTHER POWDERED SUBSTANCES.

Application filed January 22, 1920. Serial No. 353,569.

*To all whom it may concern:*

Be it known that I, GEORGE E. CLEWETT, a citizen of the United States, residing at 1044 West 43rd Street, in the city of Los Angeles, county of Los Angeles, and State of California, have invented a new and useful Dispenser for Malted Milk and Other Powdered Substances, of which the following is a specification.

An object of this invention is to provide means whereby the operator in dispensing malted milk, cocoa and like powdered substances may, by the simple revolution of a crank, measure and deposit from a container into a glass, cup, or like receptacle, a predetermined and unvariable amount of such substance, said amount being what is required for an average cup of malted milk or equal to a tablespoonful more or less as may be decided upon.

Another object is to provide a device of this character which is at once simple, sanitary, economical of construction, and neat in appearance.

Another object is to so construct a dispensing device that powdered materials such as malted milk, cocoa and like substances may be dispensed without any scattering or waste of such substances and with the least possible expenditure of time and labor.

Other objects, advantages and features of invention may appear from the accompanying drawing, the subjoined detailed description and the appended claims.

The accompanying drawing illustrates the invention.

Figure 1 is a fragmental side elevation of the dispenser with jar in place, broken to contract the view and a glass in place, ready to receive a charge of malted milk or other powdered substance.

Fig. 2 is a plan section of the dispenser on line $x^2$ Fig. 1.

Fig. 3 is a broken sectional elevation on a larger scale viewed from the left of Fig. 1 omitting the standard. The housing is shown in section and parts are broken away to disclose interior construction.

Fig. 4 is an elevation partly in section viewed from the left of Fig. 3.

Fig. 5 is a bottom view showing the operative parts, the reduced lower end of the housing cut away for clearness of illustration.

In Figs. 3, 4 and 5 the outlet is closed.

The hopper 1 may be of cast or sheet metal or of other suitable material, and may be of any suitable cross-sectional form. It is preferably circular in plan at the top or open end 2 while the lower end 3 is drawn in to conform to the shape of a rotary stirring means 4. Said stirring means is shown composed of wires 5 mounted on a hollow shaft or sleeve 6, which is keyed at 7 to the rotating crank shaft 8, revolving in bearings 9 and 9' in the sides of the end 3 of the hopper 1, and being bent at one end to form a crank 10.

A discharge opening 11 and measuring spout 12 are provided at the bottom of the hopper; the spout being of sufficient size to contain the desired amount of powdered substance and being normally closed by a trap door 13 which is hinged by a pintle 14 in bearings and is opened and closed by oscillating pintle.

The trap door 13 is fixed to the pintle by suitable means as by a pin shown at 16. Said pintle 14 is journaled to the hopper 1 and spout 12 at 17 and 18. One end of said pintle 14 is provided with a pinion 19 which meshes with a toothed segment 20 formed as one end of an oscillating arm 21 that is pivoted at 22 to the hopper 1 and is provided at the end opposite the segment 20 with cam means 23 operated by the movement of the crank 10 revolving the crank shaft 8.

On the end of the shaft 8 opposite the crank 10 is fixed an arm 24 which carries a roller 25, said roller serving to operate the rocking arm 21 by bearing against the cam 23 as shown in Fig. 4. A spring 26 operates to return the cam 23 and arm 21 to former position after the roller 25 has passed its contact with cam 23. The stirring means 4 serves as an automatic cut off for the discharge opening 11 being provided on its periphery for approximately one half circumference by a sheet metal strip 27 forming a gate which fits closely the bottom of the lower portion 3 of the hopper 1 and is of sufficient width to effectually close the opening 11 during a part of the revolution of the stirring means 4 and thereby forms a gate for said opening 11.

The trap door 13 which closes the discharge spout 12 extends across the lower end thereof and begins to open as the roller 25 comes in contact with the cam face 23 and remains open through the action of the pinion 19 and segment 20 while the roller 25 and cam 23 are in such contact; and closes by means of the spring 26 directly after such contact. The device is timed so that the gate 27 will be closed before the cover 13 begins to open and will remain closed until after said cover 13 has been returned to closed position.

A band 28 encircles the top of the hopper 1 and is used as means of support for the housing 29. Said housing is of sufficient size to cover the mechanism of the device and to prevent any scattering of the powdered contents of the dispenser and for that purpose it is slightly contracted or drawn in at the bottom or open end as shown at 30. Attaching means as shown at 31 are provided at the top of said housing 29.

The device may be supported by a standard 32 the upper end of which is secured to the band 28 on the dispenser. The standard is held in upright position by a base 33, preferably a slab of marble; and upon the standard is secured a retainer 34 forked at 35 to permit the placing of a glass 36 or other receptacle desired to receive the charge of powdered substance.

A supply jar 37 may be placed on the dispenser; its open mouth extending into the open top of the hopper 1 and as shown in Fig. 1 the top of said jar 37 may also be open; being normally closed by a cover 38. Such jar may be adapted to hold 5 pounds more or less of powdered substance. In place of using the supply jar as shown, it is equally practical to supply the hopper from the original package not shown by simply upending the bottle of malted milk or the like and resting the same as before described on the top of the hopper.

In practical operation the hopper being supplied with the malted milk, cocoa or other powdered substance, all that is necessary is one turn of the crank to deposit the desired charge into the receptacle, and should a greater amount be desired it is obvious that two or more turns may be made, each turn of the crank also stirring the powdered contents of the hopper and preventing it from becoming clogged.

A transverse radial blade 40 on an arm of the stirrer insures a complete stirring of the lower part of the hopper contents and may extend almost to the side wall of the hopper.

In some instances a smaller charge may be desired; and for the purpose of varying the amount in the measuring spout 12, one or more auxiliary rings 39 shown in Fig. 4 may be sprung into place within the measuring chamber or spout closely hugging the walls thereof. It is thus clear that by providing rings of different thickness an almost unlimited variation in reduction of capacity of the measuring chamber is attained.

I claim:

1. In combination with an open top container provided at its lower end with a measuring chamber; said measuring chamber slightly flaring downwardly at its discharge end; there being a discharge port between said container and said measuring chamber; stirring means within said chamber; gate means provided on the periphery of said stirring means for intermittently opening and closing said discharge port; adjustable means for varying the capacity of said measuring chamber, said adjustable means adapted to fit the periphery of said measuring chamber; a closure for the discharge end of said measuring chamber and being outside thereof; and automatic means for maintaining said closure in closed position while the discharge port from said container is open, and of opening said closure after the closing of said discharge port.

2. In a dispenser for powdered substances, a container having a discharge port, a rotatable stirring means within said container, said stirring means being fixed to a shaft, a crank on one end of said shaft for operating said stirring means, means on said stirring means for opening and closing said port, a measuring spout connected to said container and surrounding said port, a closure for the discharge end of said spout pivotally connected to said spout, an oscillating arm pivotally connected to said container, and means on the other end of said shaft for oscillating said arm so as to open said closure.

3. In a dispenser for powdered substances, a container having a discharge port, a rotatable stirring means within said container, said stirring means being fixed to a shaft, a crank on one end of said shaft for operating said stirring means, means on said stirring means for opening and closing said port, a measuring spout connected to said container and surrounding said port, a closure for said spout pivotally connected to said spout, an oscillating arm pivotally connected to said container; means on the other end of said shaft for oscillating said arm so as to open said closure after said port is closed, and automatic means to oscillate said arm so as to close said closure before said port is opened.

4. In a dispenser for powdered substances, a container having a discharge port, a rotatable stirring means within said container, said stirring means being fixed to a shaft, a crank on one end of said shaft for operating said stirring means, means on said stirring means for opening and closing said port, a measuring spout connected to said container and surrounding said port, a closure for the discharge end of said spout pivotally connected to said container, an oscillating arm pivotally connected to said container; means on the other end of said shaft for oscillating said arm so as to open said closure after said port is closed; automatic means to oscillate said arm so as to close said closure before said port is opened, and a housing open at the bottom and being secured to said container and surrounding said port, measuring spout and automatic means and adapted to prevent scattering of the substances discharged from the measuring spout.

5. In a dispenser for powdered substances, a container having a discharge port, a measuring spout surrounding said port; a rotary mixer in said container; means on said mixer for opening and closing said port; a crank for operating said mixer; a closure for said spout; an arm secured to said crank, and means operated by said arm to open said closure.

6. In a dispenser for powdered substances, a container having a discharge port; a measuring spout surrounding said port; a rotary mixer in said container; means on said mixer for opening and closing said port; a crank for operating said mixer; a closure for said spout, an arm secured to said crank; means operated by said arm to open said closure; and automatic means to operate the means operated by said arm to close said closure.

7. In a dispenser for powdered substances, a container having a discharge port; a measuring spout surrounding said port; a rotary mixer in said container; means on said mixer for opening and closing said port; a crank for operating said mixer; a closure for said spout; an arm secured to said crank, and means pivotally connected to said container and operated by said arm to open said closure.

8. In a dispenser for powdered substances, a container having a discharge port; a measuring spout surrounding said port; a rotary mixer in said container; means on said mixer for opening and closing said port; a crank for operating said mixer; a closure for said spout; an arm secured to said crank, and means operated by said arm to open said closure and an open bottomed housing removably secured to said container and surrounding said port, measuring spout, closure and operated means.

9. In a dispenser for powdered substances, a container having a discharge port; rotatable stirring means within said container; said means being fixed to a crank shaft; a crank on one end of said shaft for operating said means; means on said stirring means for opening and closing said port; a measuring spout connected to said container and surrounding said port, a pintle journalled to said container and having a pinion at one end; a closure for the discharge end of said spout fixed to said pintle; an oscillating arm pivoted to said container and having a toothed segment meshing with said pinion; and means fixed to said shaft for oscillating said arm to open said closure after said port is closed.

10. In a dispenser for powdered substances, a container having a discharge port; rotatable stirring means within said container; said means being fixed to a crank shaft; a crank on one end of said shaft for operating said means; means on said stirring means for opening and closing said port; a measuring spout connected to said container and surrounding said port; a pintle journalled to said container and having a pinion at one end; a closure for the discharge end of said spout fixed to said pintle; an oscillating arm pivoted to said container and having a toothed segment meshing with said pinion; means fixed to said shaft for oscillating said arm to open said closure after said port is closed; and automatic means to oscillate said arm so as to close said closure before said port is opened.

11. In a dispenser for powdered substances, a container having a discharge port. rotatable stirring means within said container; said means being fixed to a crank shaft; a crank on one end of said shaft for operating said means; means on said stirring means for opening and closing said port; a measuring spout connected to said container and surrounding said port; a pintle journalled to said container and having a pinion at one end; a closure for the discharge end of said spout fixed to said pintle; an oscillating arm pivoted to said container and having a toothed segment meshing with said pinion; means fixed to said shaft for oscillating said arm to open said closure after said port is closed; automatic means to oscillate said arm so as to close said closure before said port is opened; and means at the top of said container adapted to support a housing for said port, measuring spout and automatic means.

12. In a dispenser for powdered substances, a container having a discharge port, a measuring spout surrounding said port; a mixer in said container; means on said mixer for opening and closing said port; a closure for said spout; means operable by operation of said mixer to open said closure; and means adapted to hug the walls of the measuring spout to vary the capacity of the measuring spout.

In testimony whereof, I have hereunto set my hand at Los Angeles, California, this 16th day of January, 1920.

GEORGE E. CLEWETT.

Witness:
   JAMES R. TOWNSEND.